United States Patent
Yu et al.

(10) Patent No.: US 11,120,246 B2
(45) Date of Patent: Sep. 14, 2021

(54) METHOD AND SYSTEM FOR PROVIDING VIBRATION NOTIFICATION BASED ON FINGERPRINT SIMILARITY

(71) Applicant: JRD Communication (Shenzhen) LTD., Shenzhen (CN)

(72) Inventors: Bin Yu, Shenzhen (CN); Weiqin Yang, Shenzhen (CN)

(73) Assignee: JRD COMMUNICATION (SHENZHEN) LTD., Shenzhen (CN)

(*) Notice: Subject to any disclaimer, the term of this patent is extended or adjusted under 35 U.S.C. 154(b) by 155 days.

(21) Appl. No.: 16/492,564

(22) PCT Filed: Mar. 9, 2018

(86) PCT No.: PCT/CN2018/078584
§ 371 (c)(1),
(2) Date: Sep. 9, 2019

(87) PCT Pub. No.: WO2018/161961
PCT Pub. Date: Sep. 13, 2018

(65) Prior Publication Data
US 2021/0142035 A1    May 13, 2021

(30) Foreign Application Priority Data
Mar. 10, 2017   (CN) .......................... 201710141732.6

(51) Int. Cl.
G06K 9/00    (2006.01)
G06F 3/01    (2006.01)

(52) U.S. Cl.
CPC ......... *G06K 9/00087* (2013.01); *G06F 3/016* (2013.01)

(58) Field of Classification Search
CPC .......................... G06K 9/00087; G06F 3/016
See application file for complete search history.

(56) References Cited

U.S. PATENT DOCUMENTS 8,717,151 B2   5/2014   Babak
9,697,440 B2   7/2017   Xiong et al.
(Continued)

FOREIGN PATENT DOCUMENTS

CN    101697187 A    4/2010
CN    103534666 A    1/2014
(Continued)

*Primary Examiner* — Jonathan A Boyd
(74) *Attorney, Agent, or Firm* — Kirton McConkie; Evan R. Witt

(57) ABSTRACT

Disclosed are a method and system for providing vibration notification based on fingerprint similarity. The method comprises: when a fingerprint sensor detects an input of a fingerprint, acquiring information of the inputted fingerprint, comparing the inputted fingerprint with a pre-stored valid fingerprint, and performing computation to obtain a similarity degree between the inputted fingerprint and the valid fingerprint; and controlling, according to the similarity degree, a vibration magnitude of a vibration motor. In the present invention, vibration of a vibration motor is controlled according to a similarity degree between an inputted fingerprint and a valid fingerprint, and the higher the similarity degree, the higher the vibration magnitude. If the inputted fingerprint is determined to be a valid fingerprint, the vibration motor uses the highest power to output vibration.

13 Claims, 2 Drawing Sheets

Obtain an input fingerprint information when a fingerprint sensor senses a fingerprint and compare the input fingerprint information with a pre-stored valid fingerprint to calculate a similarity between the input fingerprint information and the pre-stored valid fingerprint.  — S100

Control a vibration strength of a vibration motor according to the similarity.  — S200

(56) References Cited

U.S. PATENT DOCUMENTS

| | | |
|---|---|---|
| 2006/0045350 A1 | 3/2006 | Itoh et al. |
| 2007/0124074 A1* | 5/2007 | Katoh .................. G01S 5/0231 |
| | | 455/404.2 |
| 2010/0240415 A1* | 9/2010 | Kim ....................... G06F 21/36 |
| | | 455/565 |
| 2010/0248827 A1* | 9/2010 | Shin ....................... A63F 13/10 |
| | | 463/30 |
| 2012/0286944 A1 | 11/2012 | Babak |
| 2013/0223700 A1* | 8/2013 | Huang ................. G06K 9/0002 |
| | | 382/124 |
| 2015/0186705 A1 | 7/2015 | Aleksander |
| 2015/0310308 A1 | 10/2015 | Xiong et al. |
| 2017/0255269 A1 | 9/2017 | Yang et al. |
| 2018/0293370 A1* | 10/2018 | Kim .................. G06K 9/00926 |

FOREIGN PATENT DOCUMENTS

| | | |
|---|---|---|
| CN | 103839041 A | 6/2014 |
| CN | 105100492 A | 11/2015 |
| CN | 105302373 A | 2/2016 |
| CN | 205176879 U | 4/2016 |
| CN | 105843398 A | 8/2016 |
| CN | 106201288 A | 12/2016 |
| CN | 106980820 A | 7/2017 |

\* cited by examiner

METHOD AND SYSTEM FOR PROVIDING VIBRATION NOTIFICATION BASED ON FINGERPRINT SIMILARITY

CROSS REFERENCE

This application is a National Stage of International Application No. PCT/CN2018/078584, filed on Mar. 9, 2018, which claims priority to Chinese Application No. 201710141732.6, filed on Mar. 10, 2017. The entire disclosures of each of the above applications are incorporated herein by reference.

FIELD OF THE INVENTION

The present disclosure relates to a mobile terminal, and more particularly to a system and method for providing a vibration notification based on a fingerprint similarity.

BACKGROUND

More and more mobile terminals have embedded fingerprint detection technique in nowadays. A user can pre-store multiple fingerprints as valid fingerprints. Then, the mobile terminal could detect whether an input fingerprint is one of the valid fingerprints. If yes, then the mobile terminal could be unlocked or perform other operations, such as paying money. However, in order to ensure the accuracy of the fingerprint detection technique, the input fingerprint will be determined as a valid fingerprint only if the input fingerprint is identical enough to the valid fingerprint (the identical portion should be higher than a specific percentage). For example, if the user uses his thumb to store a valid fingerprint and then only input a small portion of his thumb to unlock the phone, the input thumb fingerprint may be determined as an invalid fingerprint because the area is too small. In other words, even if the user uses the right finger to unlock the mobile terminal, the fingerprint sensor might incorrectly determine that fingerprint as an invalid fingerprint. This is inconvenient for the user. Therefore, this technique needs to be improved.

SUMMARY

The technical issue that a preferred embodiment of the present disclosure solves is to provide a system and method for providing a vibration notification based on a fingerprint similarity. That is, a preferred embodiment of the present disclosure could control a vibration motor to vibrate according to a similarity between an input fingerprint information and a pre-stored valid fingerprint. When the similarity is higher, the vibration is stronger. Further, upon the condition that the input fingerprint information is determined as a valid fingerprint, the vibration motor outputs its maximum vibration strength. This could inform the user by providing different vibration strengths such that the user could adjust the finger position to raise the similarity next time. In this way, the accuracy of the fingerprint detection function could be improved and it's more convenient for the user.

In order to solve the above problem, an embodiment of the present disclosure provides a system for providing a vibration notification based on a fingerprint similarity. The system comprises a storage device, configured to store instructions; and a processor, electrically coupled to the storage device, configured to execute the instructions. The processor comprises: a similarity obtaining module, configured to obtain an input fingerprint information when a fingerprint sensor senses a fingerprint and compare the input fingerprint information with a pre-stored valid fingerprint to calculate a similarity between the input fingerprint information and the pre-stored valid fingerprint and a vibration motor control unit, configured to control a vibration strength of a vibration motor according to the similarity. The similarity obtaining module comprises a fingerprint obtaining unit, configured to obtain the input fingerprint information when the fingerprint sensor senses the fingerprint and a similarity calculating unit, configured to compare the input fingerprint information with the pre-stored valid fingerprint to calculate a percentage of the input fingerprint information identical to the pre-stored valid fingerprint to determine the similarity between the input fingerprint information and the pre-stored valid fingerprint. The vibration motor control unit comprises a vibration motor calculating unit, configured to calculate the vibration strength according to the similarity and a vibration motor control unit, configured to control the vibration motor to vibrate according to the vibration strength.

In order to solve the above problem, another embodiment of the present disclosure provides a method for providing a vibration notification based on a fingerprint similarity. The method comprises: Step A: obtaining an input fingerprint information when a fingerprint sensor senses a fingerprint and comparing the input fingerprint information with a pre-stored valid fingerprint to calculate a similarity between the input fingerprint information and the pre-stored valid fingerprint and Step B: controlling a vibration strength of a vibration motor according to the similarity.

In order to solve the above problem, another embodiment of the present disclosure provides a system for providing a vibration notification based on a fingerprint similarity. The system comprises a storage device configured to store instructions, and a processor coupled to the storage device and configured to execute the instructions to perform operations of: obtaining an input fingerprint information when a fingerprint sensor senses a fingerprint and comparing the input fingerprint information with a pre-stored valid fingerprint to calculate a similarity between the input fingerprint information and the pre-stored valid fingerprint; and controlling a vibration strength of a vibration motor according to the similarity.

In contrast to the prior art, the present disclosure discloses a system, a method and related steps for providing a vibration notification based on a fingerprint similarity. When a fingerprint sensor detects an input fingerprint, it could obtain an input fingerprint information and compare the input fingerprint information with a pre-stored valid fingerprints to calculate a similarity between an input fingerprint information and a pre-stored valid fingerprint. Then, a vibration motor is controlled to vibrate according to a similarity between an input fingerprint information and a pre-stored valid fingerprint. When the similarity is higher, the vibration is stronger. Further, upon the condition that the input fingerprint information is determined as a valid fingerprint, the vibration motor outputs its maximum vibration strength. This could inform the user by providing different vibration strengths such that the user could adjust the finger position to raise the similarity next time. In this way, the accuracy of the fingerprint detection function could be improved and it's more convenient for the user.

DETAILED DESCRIPTION OF PREFERRED EMBODIMENTS

To make the objectives, technical schemes, and technical effects of the present disclosure more clearly and definitely, the present disclosure will be described in details below by using embodiments in conjunction with the appending drawings. It should be understood that the specific embodiments described herein are merely for explaining the present disclosure, but is not intended to limit the present disclosure.

Figure 1:
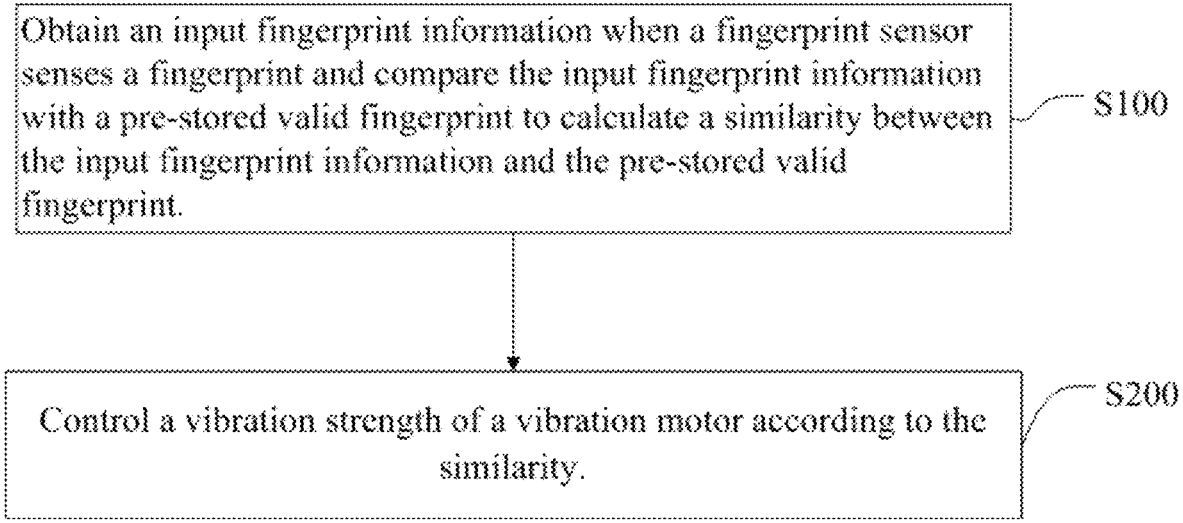
FIG. 1 is a flow chart showing a method for providing a vibration notification based on a fingerprint similarity according to a preferred embodiment of the present disclosure.

Please refer to FIG. 1, which is a flow chart showing a method for providing a vibration notification based on a fingerprint similarity according to a preferred embodiment of the present disclosure. As shown in FIG. 1, the method comprises:

Step S100: Obtain an input fingerprint information when a fingerprint sensor senses a fingerprint and compare the input fingerprint information with a pre-stored valid fingerprint to calculate a similarity between the input fingerprint information and the pre-stored valid fingerprint. Specifically, Step S100 comprises:

Step S110: Obtaining the input fingerprint information when the fingerprint sensor senses the fingerprint; and Step S120: Compare the input fingerprint information with the pre-stored valid fingerprint to calculate a percentage of the input fingerprint information identical to the pre-stored valid fingerprint to determine the similarity between the input fingerprint information and the pre-stored valid fingerprint.

In this embodiment, the user could pre-store multiple fingerprints as valid fingerprints in a mobile terminal. When the fingerprint sensor of the mobile terminal detects an input fingerprint from the user, the fingerprint sensor obtains an input fingerprint information. Then, the mobile terminal compares the input fingerprint information with the pre-stored valid fingerprints to select one valid fingerprint that is closest to the input fingerprint information. Further, the mobile terminal compares the selected pre-stored valid fingerprint with the input fingerprint information to obtain the identical portion between the selected pre-stored valid fingerprint with the input fingerprint information such that a percentage of the input fingerprint information identical to the pre-stored valid fingerprint could be calculated to determine the similarity between the input fingerprint information and the pre-stored valid fingerprint.

The method further comprises: Step S200: Control a vibration strength of a vibration motor according to the similarity.

In this embodiment, the mobile terminal controls the vibration strength of the vibration motor according to the similarity. In this way, the mobile terminal provides a user with a vibration notification according to the fingerprint similarity.

In a preferred embodiment, the step S200 comprises:

Step S210: Calculate the vibration strength according to the similarity; and

Step S220: Control the vibration motor to vibrate according to the vibration strength.

In this embodiment, the mobile terminal calculates the vibration strength according to the similarity. If the input fingerprint information is determined as a valid fingerprint, then the mobile terminal controls the vibration motor to output a maximum vibration strength.

In this embodiment, the input fingerprint information will be determined as a valid fingerprint to unlock the mobile terminal or to pay money only if a percentage of the input fingerprint information identical to the pre-stored valid fingerprint is higher than a threshold value.

For example, the input fingerprint information will be determined as a valid fingerprint only if a percentage of the input fingerprint information identical to the pre-stored valid fingerprint is higher than 80%. In this way, if the user only input a small portion of his finger when the user tries to unlock the mobile terminal, then although the fingerprint is correct, the input fingerprint information may not be determined as a valid fingerprint because the similarity cannot reach 80% because the input fingerprint is too small.

In this embodiment, the mobile terminal controls the vibration motor to output a maximum vibration strength if the input fingerprint information is determined as a valid fingerprint.

Further, the Step 210 comprises: Calculate the vibration strength according to a formula $y=x*ymax/xth$; where y is the vibration strength, x is the similarity, ymax is the maximum vibration strength, and xth is a similarity threshold. The mobile terminal determines the input fingerprint information to be a valid fingerprint upon the condition that the similarity is higher than the threshold.

In this embodiment, when the similarity is higher, the vibration strength is stronger. If the input fingerprint information is determined as a valid fingerprint, the vibration motor outputs its maximum vibration strength.

For example, if 80% is the similarity threshold (meaning that an input fingerprint information having a similarity reaching 80% will be determined as a valid fingerprint), then the vibration motor output its maximum vibration strength when the similarity reaches 80%. In other words, even if the similarity is higher than 80%, the vibration motor still outputs its maximum vibration strength. However, when the similarity is lower than 80%, then the vibration strength outputted by the vibration motor becomes weaker. Further, the lower the similarity, the weaker the vibration strength.

For example, if the current similarity is 70%, the maximum vibration strength is 100, and the threshold is 80%, then the current vibration strength becomes 70%*100/80%=87.5, which is used to control the vibration motor to vibrate based on the vibration strength 87.5.

When the similarity between the input fingerprint information and the valid fingerprint is 70%, the vibration strength reaches 87.5 such that the user is informed that the input fingerprint only has a small difference from the valid fingerprint. Therefore, the user could adjust the position of his finger next time to raise the similarity until the input fingerprint information is determined as the valid fingerprint. Similarly, if the vibration strength is low, the user could enormously adjust the position of his finger to raise the similarity.

Accordingly, the present disclosure discloses a method for providing a vibration notification based on a fingerprint similarity. A similarity between an input fingerprint information and a pre-stored valid fingerprint is calculated. Then, a vibration motor is controlled to vibrate according to a similarity between an input fingerprint information and a pre-stored valid fingerprint. When the similarity is higher, the vibration is stronger. Further, upon the condition that the input fingerprint information is determined as a valid fingerprint, the vibration motor outputs its maximum vibration strength. This could inform the user by providing different vibration strengths such that the user could adjust the finger position to raise the similarity next time. In this way, the accuracy of the fingerprint detection function could be improved and it's more convenient for the user.

Figure 3:
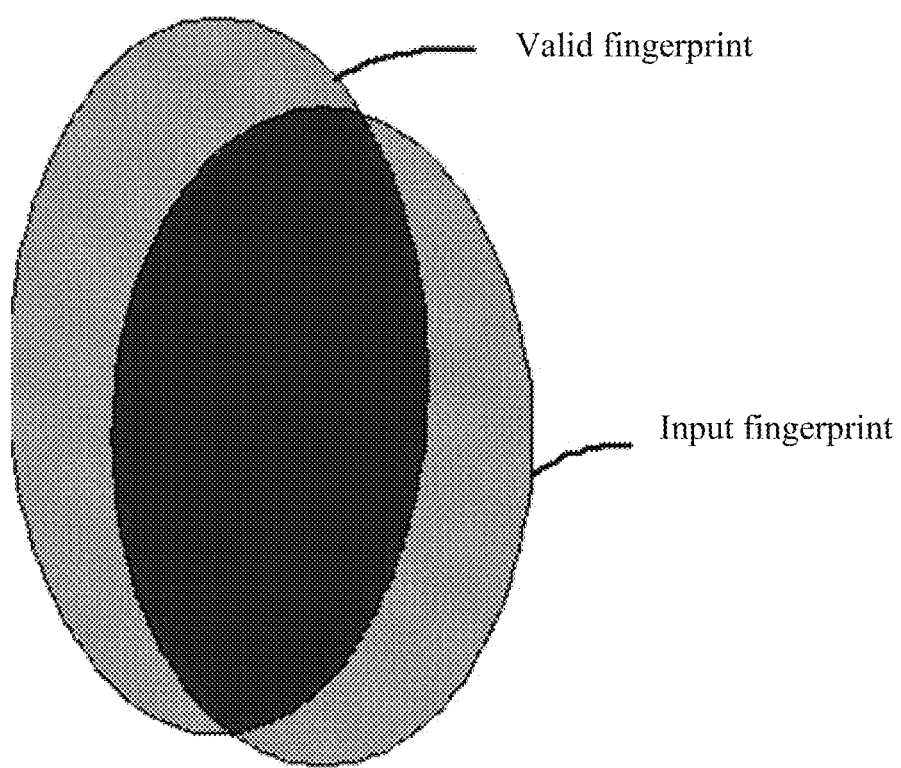
FIG. 3 is a diagram showing a similarity between an input fingerprint information and a pre-stored valid fingerprint according to a preferred embodiment of the present disclosure.

Please refer to FIG. 3, which is a diagram showing a similarity between an input fingerprint information and a pre-stored valid fingerprint according to a preferred embodiment of the present disclosure.

In FIG. 3, the valid fingerprint is a pre-stored valid fingerprint and the input fingerprint is an input fingerprint currently input by the user. The shown overlapped portion is the similar portion between the pre-stored valid fingerprint and the input fingerprint.

Figure 2:
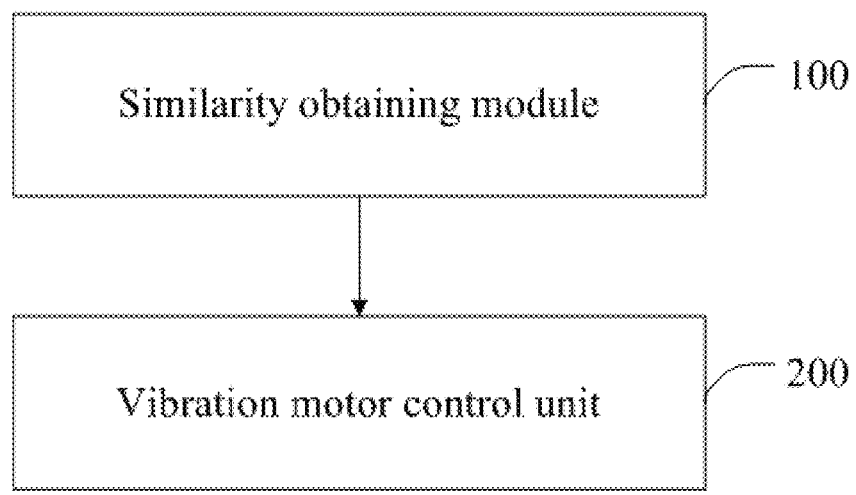
FIG. 2 is a functional block diagram of a system for providing a vibration notification based on a fingerprint similarity according to a preferred embodiment of the present disclosure.

Please refer to FIG. 2, which is a functional block diagram of a system for providing a vibration notification based on a fingerprint similarity according to a preferred embodiment of the present disclosure. The system comprises a similarity obtaining module 100, configured to obtain an input fingerprint information when a fingerprint sensor senses a fingerprint and compare the input fingerprint information with a pre-stored valid fingerprint to calculate a similarity between the input fingerprint information and the pre-stored valid fingerprint. The details of its operation had been illustrated above and thus omitted here for simplicity.

The system further comprises a vibration motor control unit 200, configured to control a vibration strength of a vibration motor according to the similarity. The details of its operation had been illustrated above and thus omitted here for simplicity.

Further, the similarity obtaining module 100 comprises a fingerprint obtaining unit, configured to obtain the input fingerprint information when the fingerprint sensor senses the fingerprint. The details of its operation had been illustrated above and thus omitted here for simplicity.

The similarity obtaining module 100 further comprises a similarity calculating unit, configured to compare the input fingerprint information with the pre-stored valid fingerprint to calculate a percentage of the input fingerprint information identical to the pre-stored valid fingerprint to determine the similarity between the input fingerprint information and the pre-stored valid fingerprint. The details of its operation had been illustrated above and thus omitted here for simplicity.

Further, the vibration motor control unit 200 comprises a vibration motor calculating unit, configured to calculate the vibration strength according to the similarity. The details of its operation had been illustrated above and thus omitted here for simplicity.

The vibration motor control unit further comprises a vibration motor control unit, configured to control the vibration motor to vibrate according to the vibration strength.

The vibration motor calculating unit compares the input fingerprint information with the pre-stored valid fingerprint to see if the input fingerprint information is a valid fingerprint; and controls the vibration motor to output a maximum vibration strength if the input fingerprint information is determined as a valid fingerprint. The details of this operation had been illustrated above and thus omitted here for simplicity.

Further, the vibration strength is calculated according to a formula $y=x*ymax/xth$; where y is the vibration strength, x is the similarity, ymax is the maximum vibration strength, and xth is a similarity threshold. The input fingerprint information is determined as a valid fingerprint upon the condition that the similarity is larger than the threshold. The details of this operation had been illustrated above and thus omitted here for simplicity.

Moreover, based on the aforementioned method for providing vibration notification based on the fingerprint similarity, the present disclosure further provides a system for providing vibration notification based on the fingerprint similarity. The system comprises a storage device, configured to store instructions; and a processor, coupled to the storage device, configured to execute the instructions to perform the aforementioned method. Further, the operations performed by the processor of the system are corresponding to the modules/units shown in FIG. 2.

In contrast to the conventional art, the present disclosure discloses a system and a method for providing a vibration notification based on a fingerprint similarity. A similarity between an input fingerprint information and a pre-stored valid fingerprint is calculated. Then, a vibration motor is controlled to vibrate according to a similarity between an input fingerprint information and a pre-stored valid fingerprint. When the similarity is higher, the vibration is stronger. Further, upon the condition that the input fingerprint information is determined as a valid fingerprint, the vibration motor outputs its maximum vibration strength. This could inform the user by providing different vibration strengths such that the user could adjust the finger position to raise the similarity next time. In this way, the accuracy of the fingerprint detection function could be improved and it's more convenient for the user.

Above are embodiments of the present disclosure, which does not limit the scope of the present disclosure. Any modifications, equivalent replacements or improvements within the spirit and principles of the embodiment described above should be covered by the protected scope of the invention.

What is claimed is:

1. A system for providing a vibration notification based on a fingerprint similarity comprising:
   a storage device, configured to store instructions; and
   a processor, electrically coupled to the storage device, configured to execute the instructions, the instructions comprising:
      a similarity obtaining module, configured to cause the first processor to obtain an input fingerprint information when a fingerprint sensor senses a fingerprint and compare the input fingerprint information with a pre-stored valid fingerprint to calculate a similarity between the input fingerprint information and the pre-stored valid fingerprint, the similarity obtaining module comprising:
         a fingerprint obtaining unit, configured to cause the first processor to obtain the input fingerprint information when the fingerprint sensor senses the fingerprint; and
         a similarity calculating unit, configured to cause the first processor to compare the input fingerprint information with the pre-stored valid fingerprint to calculate a percentage of the input fingerprint information identical to the pre-stored valid fingerprint to determine the similarity between the input fingerprint information and the pre-stored valid fingerprint; and
      a vibration motor control unit, configured to cause the first processor to control a vibration strength of a vibration motor according to the similarity between the input fingerprint information and the pre-stored valid fingerprint; the vibration motor control unit comprising:
a vibration motor calculating unit, configured to cause the first processor to calculate the vibration strength according to the similarity between the input fingerprint information and the pre-stored valid fingerprint; and
a vibration motor control unit, configured to cause the first processor to control the vibration motor to vibrate according to the vibration strength.

2. The system of claim 1, wherein the processor executes the instructions to perform following operations:
comparing the input fingerprint information with the pre-stored valid fingerprint to see if the input fingerprint information is a valid fingerprint; and
if the input fingerprint information is determined as a valid fingerprint, then controlling the vibration motor to output a maximum vibration strength.

3. The system of claim 2, wherein the processor executes the instructions to further perform following operations:
calculating the vibration strength according to a formula $y=x*ymax/xth$; wherein y is the vibration strength, x is the similarity, ymax is the maximum vibration strength, and xth is a similarity threshold; and
upon the condition that the similarity is larger than the threshold, determining that the input fingerprint information is a valid fingerprint.

4. A method for providing a vibration notification based on a fingerprint similarity, comprising:
Step A: obtaining an input fingerprint information when a fingerprint sensor senses a fingerprint and comparing the input fingerprint information with a pre-stored valid fingerprint to calculate a similarity between the input fingerprint information and the pre-stored valid fingerprint; and
Step B: controlling a vibration strength of a vibration motor according to the similarity between the input fingerprint information and the pre-stored valid fingerprint.

5. The method of claim 4, wherein the step A comprises:
Step A1: obtaining the input fingerprint information when the fingerprint sensor senses the fingerprint; and
Step A2: comparing the input fingerprint information with the pre-stored valid fingerprint to calculate a percentage of the input fingerprint information identical to the pre-stored valid fingerprint to determine the similarity between the input fingerprint information and the pre-stored valid fingerprint.

6. The method of claim 4, wherein the step B comprises:
Step B1: calculating the vibration strength according to the similarity; and
Step B2: controlling the vibration motor to vibrate according to the vibration strength.

7. The method of claim 6, wherein the step B1 comprises:
comparing the input fingerprint information with the pre-stored valid fingerprint to see if the input fingerprint information is a valid fingerprint; and
if the input fingerprint information is determined as a valid fingerprint, then controlling the vibration motor to output a maximum vibration strength.

8. The method of claim 7, wherein the step B1 further comprises:
calculating the vibration strength according to a formula $y=x*ymax/xth$; wherein y is the vibration strength, x is the similarity, ymax is the maximum vibration strength, and xth is a similarity threshold; and
upon the condition that the similarity is higher than the threshold, determining the input fingerprint information to be a valid fingerprint.

9. A system for providing a vibration notification based on a fingerprint similarity, comprising:
a storage device, configured to store instructions; and
a processor, coupled to the storage device, configured to execute the instructions to perform operations of:
obtaining an input fingerprint information when a fingerprint sensor senses a fingerprint and comparing the input fingerprint information with a pre-stored valid fingerprint to calculate a similarity between the input fingerprint information and the pre-stored valid fingerprint; and
controlling a vibration strength of a vibration motor according to the similarity between the input fingerprint information and the pre-stored valid fingerprint.

10. The system of claim 9, wherein the processor executes the instructions to further perform operations of:
obtaining the input fingerprint information when the fingerprint sensor senses the fingerprint; and
comparing the input fingerprint information with the pre-stored valid fingerprint to calculate a percentage of the input fingerprint information identical to the pre-stored valid fingerprint to determine the similarity between the input fingerprint information and the pre-stored valid fingerprint.

11. The system of claim 9, wherein the processor executes the instructions to further perform operations of:
calculating the vibration strength according to the similarity; and
controlling the vibration motor to vibrate according to the vibration strength.

12. The system of claim 11, wherein the processor executes the instructions to further perform operations of:
comparing the input fingerprint information with the pre-stored valid fingerprint to see if the input fingerprint information is a valid fingerprint; and
if the input fingerprint information is determined as a valid fingerprint, then controlling the vibration motor to output a maximum vibration strength.

13. The system of claim 12, wherein the processor executes the instructions to further perform operations of:
calculating the vibration strength according to a formula $y=x*ymax/xth$; wherein y is the vibration strength, x is the similarity, ymax is the maximum vibration strength, and xth is a similarity threshold; and
upon the condition that the similarity is higher than the threshold, determining the input fingerprint information to be a valid fingerprint.

* * * * *